R. R. SHAPLEY.
LATHE TOOL.
APPLICATION FILED OCT. 24, 1911.
1,021,899.
Patented Apr. 2, 1912.
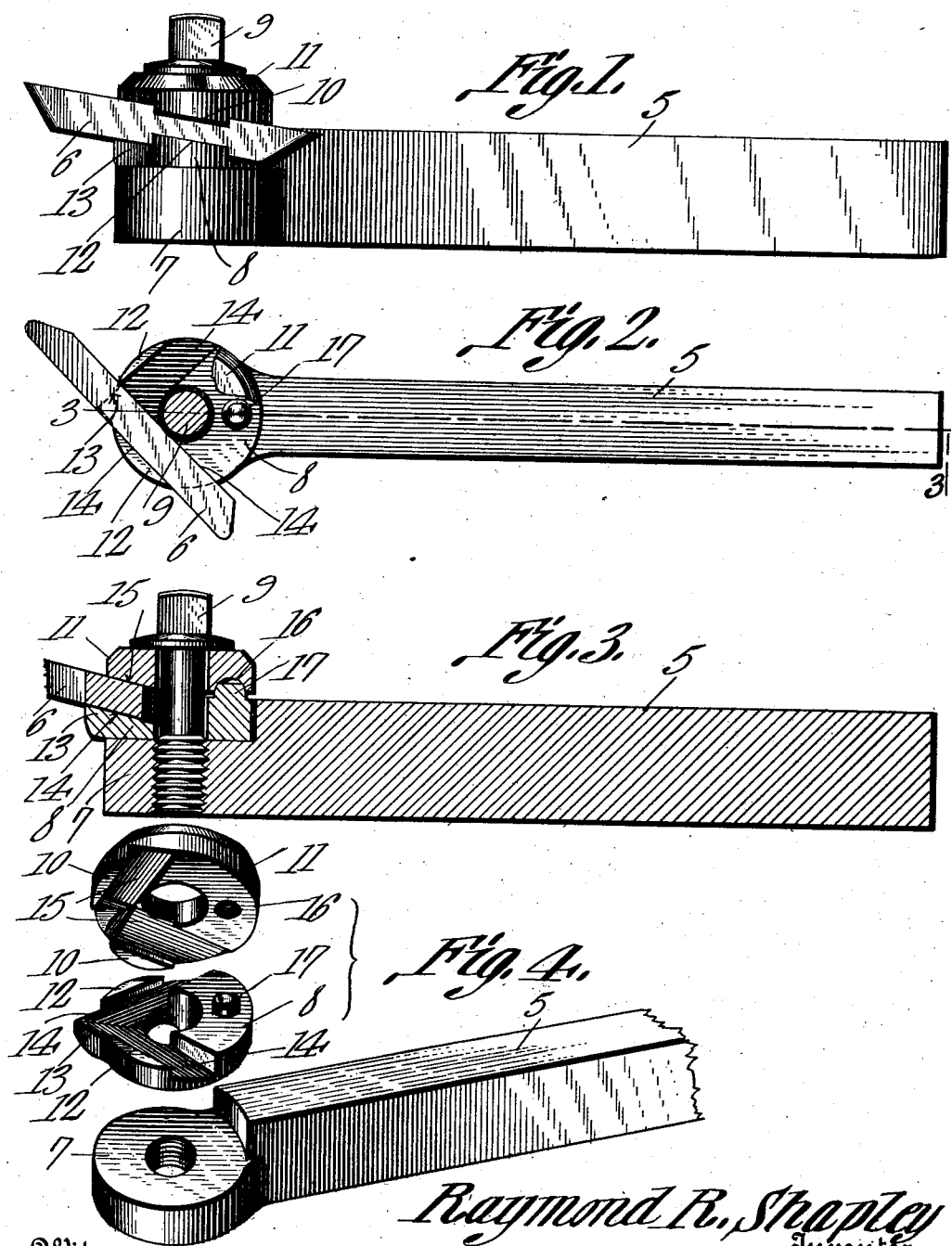
Raymond R. Shapley
Inventor
Witnesses
C. A. Snow & Co.
Attorneys

UNITED STATES PATENT OFFICE.

RAYMOND R. SHAPLEY, OF HARRISBURG, PENNSYLVANIA, ASSIGNOR OF ONE-HALF TO BENJAMIN F. SNAVELY, OF HARRISBURG, PENNSYLVANIA.

LATHE-TOOL.

1,021,899.  Specification of Letters Patent.  Patented Apr. 2, 1912.

Application filed October 24, 1911. Serial No. 656,374.

*To all whom it may concern:*

Be it known that I, RAYMOND R. SHAPLEY, a citizen of the United States, residing at Harrisburg, in the county of Dauphin and State of Pennsylvania, have invented a new and useful Lathe-Tool, of which the following is a specification.

This invention relates to tools for lathes, milling machines, or other metal working machines, and has for its primary object to provide a tool adapted to receive a small cutter of hardened steel at one end thereof, whereby the cutter may be replaced from time to time as the same becomes worn.

A further object is to provide a tool of this character arranged to hold the cutter at various angles and for permitting the cutter to be extended or retracted and also reversed in position.

With the above and other objects in view this invention resides in the novel arrangement and construction of parts as hereinafter described and as illustrated in the accompanying drawings, wherein similar reference characters indicate similar parts, and wherein:—

Figure 1 is an elevation of a tool embodying the invention. Fig. 2 is a plan view thereof, parts broken away. Fig. 3 is a section on the line 3—3 of Fig. 2. Fig. 4 is a perspective view of various parts of the tool in separated position.

Referring to the drawings, in detail, 5 designates the shank of the tool which is of the usual form to be received and held in position upon the lathe or other machine by the usual tool post or other support, and is formed at its outer end into an eye 7. A bolt 9 is screw threaded into the eye 7 and a pair of washers 8 and 11 are arranged on the said bolt and are adapted to be clamped together between the head of the bolt and the eye 7. The washers 8 and 11 are provided with a pair of grooves 14 and 15 respectively in their adjacent faces, which grooves diverge from points on the peripheries of the said washers and are sloping from the said points. These grooves 14 and 15 form the lips 12 and 10 respectively, and the inner washer 8 is provided with a V-shaped lug 13 projecting from the periphery thereof at the point from which the grooves 14 diverge and forming a continuation of the bottom of the grooves. The outer washer 11 is provided with a notch or indentation 16 opposite the point on the periphery of the said washer from which the grooves 15 diverge and the inner washer 8 is provided with a nib or lug 17 arranged to engage the notch or indentation 16 to constrain the washers to rotate together and at the same time retain the respective grooves of the washers in registration, the grooves being in chordal positions.

The cutter is designated at 6 and in the use of the tool the said cutter is arranged to be received between the washers 8 and 11, fitting within the respective registering grooves 14 and 15 of the said washers to be held in an inclined position to provide a suitable angle of rake. This cutter may be inserted into either of the registering grooves 14 and 15 of the washers to hold the cutter in either a right hand or left hand position with respect to the shank as may be desirable or necessary in the use of the tool. The washers 8 and 11 being rotatable upon the bolt permit the cutter to be rotated upon the bolt to set same at a suitable angle and upon the bolt being tightened the cutter is firmly held between the washers which are clamped between the flanged head of the bolt and the eye 7, the cutter being retained between the washers by the lips 10 and 12 and the flange of the head of the bolt extending over the intermediate portions of the grooves. The outer end of the cutter is supported by the lug 13 and by loosening the washers it will be seen that the cutter may be extended or retracted or may be removed and reversed in position when it is desired to use the other end thereof. The cutters 6 are formed of hardened steel and upon the same becoming broken or worn out may be replaced, thus eliminating the employment of an entirely new tool or of the forging thereof as is common practice. This tool, therefore, may be used for an indefinite period of time by renewing the cutters, and reduces the expense in the maintenance of tools. The tool being adjustable is also preferable over the ordinary tool.

It is understood that this tool is susceptible of slight alterations in its details within the scope of the appended claims without departing from the spirit of the invention.

What is claimed is:—

A tool comprising a shank having an eye at one end, a bolt screw threaded into the said eye, and a pair of washers arranged on the said bolt and adapted to be clamped together and against the said eye by the said bolt and having a pair of grooves in their
5 adjacent faces diverging from points on the peripheries of the said washers and the inner washer having a V-shaped lug projecting from the point on the periphery thereof from which the grooves diverge and forming a continuation of the bottom of the 10 grooves.

In testimony that I claim the foregoing as my own, I have hereto affixed my signature in the presence of two witnesses.

RAYMOND R. SHAPLEY.

Witnesses:
FRED. W. STUART,
EUGENE SNYDER.